Oct. 29, 1929.                F. SHORT                1,733,915
            ILLUMINATING APPARATUS AND PROCESS
                Filed April 23, 1924    3 Sheets-Sheet 1
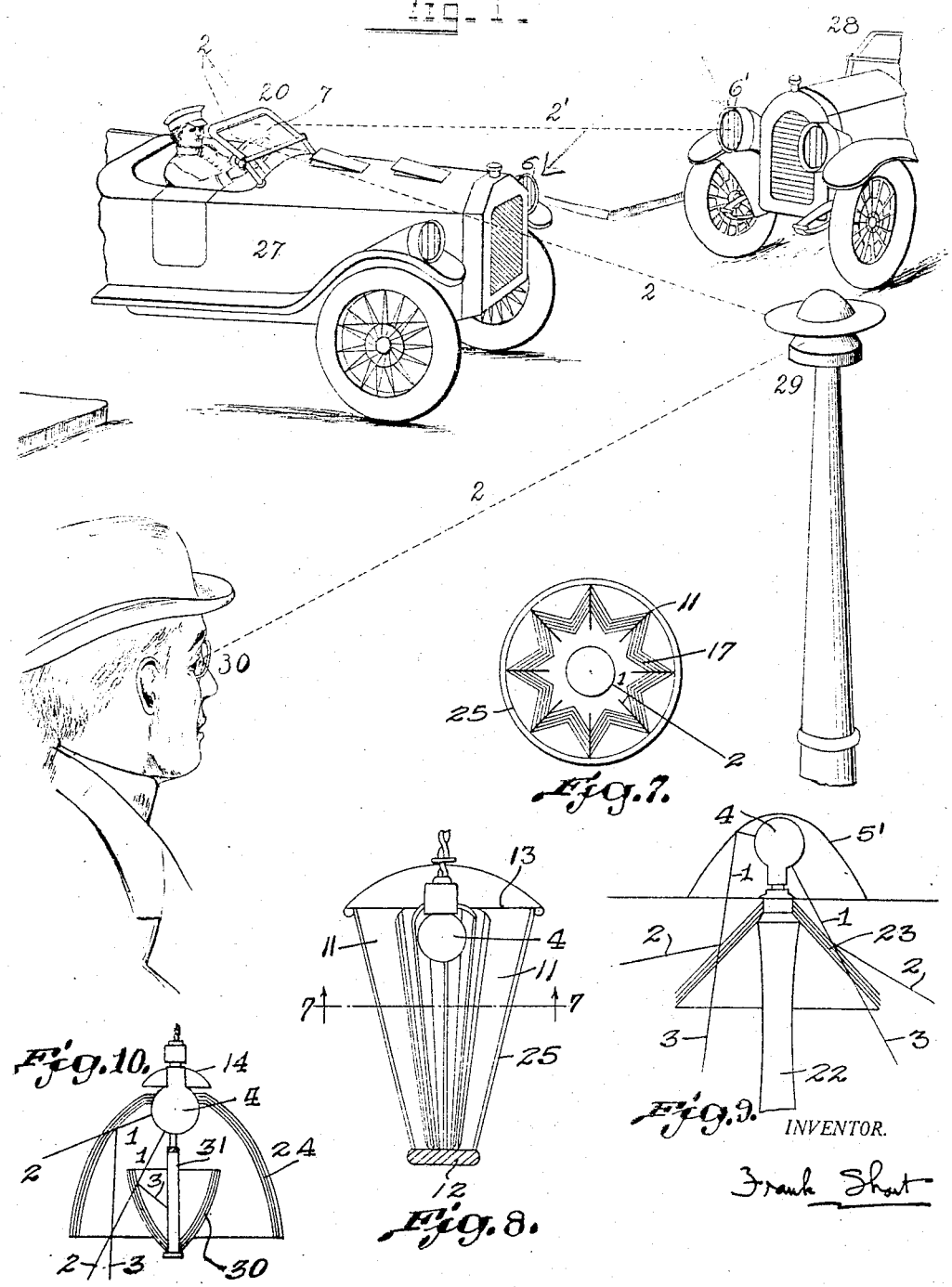
INVENTOR.
Frank Short

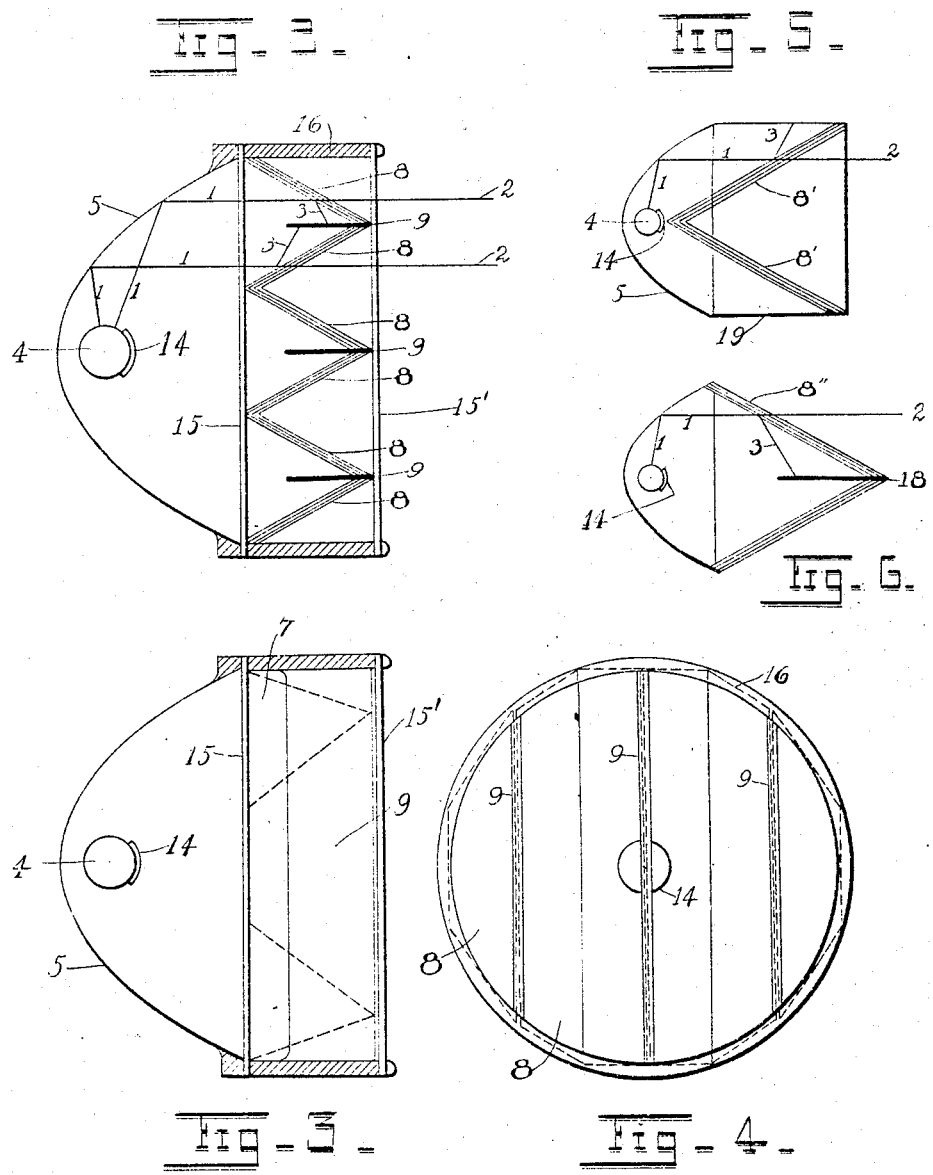

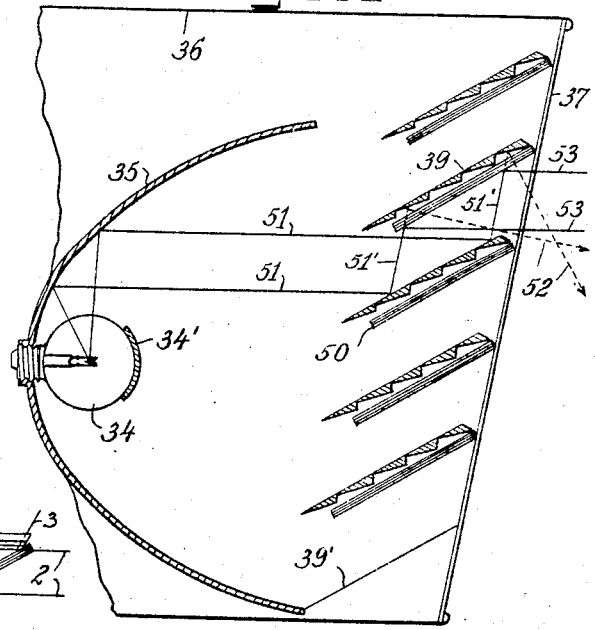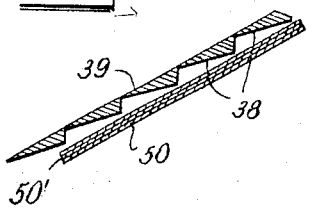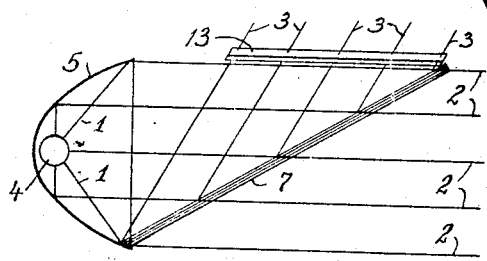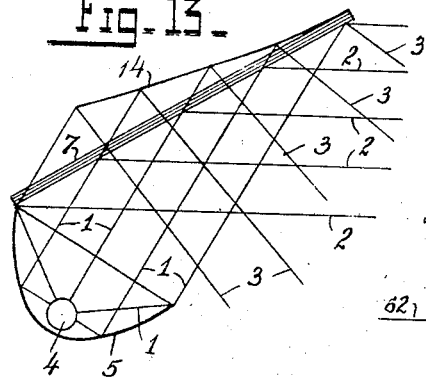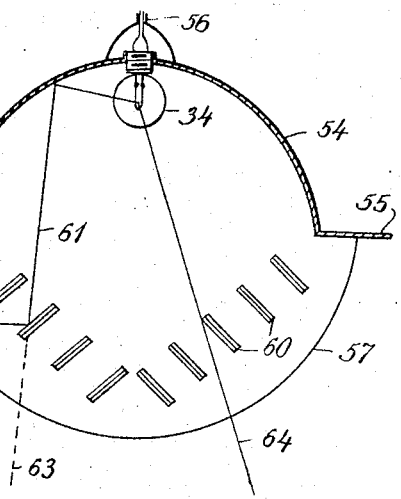

Patented Oct. 29, 1929

1,733,915

UNITED STATES PATENT OFFICE

FRANK SHORT, OF NEW YORK, N. Y., ASSIGNOR, BY DIRECT AND MESNE ASSIGNMENTS, OF ONE-HALF TO JOHN J. SERRELL, OF ELIZABETH, NEW JERSEY, AND ONE-HALF TO ROBERT A. SMITH, OF MAHWAH, NEW JERSEY

ILLUMINATING APPARATUS AND PROCESS

Application filed April 23, 1924. Serial No. 708,563.

This invention relates particularly to polarized light illuminating apparatus and processes of using the same in connection with street lighting and automobiles and other vehicles so that the glare of street lamps or vehicle headlights can be cut out by the drivers of other vehicles or pedestrians or other persons who are provided with polarized light viewing devices adapted to cut out the vertically or otherwise polarized light sent out therefrom. At the same time, such polarized light from headlights or street lamps when it strikes ordinary road objects is sufficiently depolarized or irregularly polarized or changed so that such road objects, even though illuminated by polarized light, then reflect or transmit ordinary light or other components which makes these objects visible through polarized light viewing devices which are adapted to largely or completely cut out the vertically polarized light, for instance, which illuminates these road objects.

Any suitable light polarizing devices may be used for such street lamps or automobile headlights and for practical and commercial reasons superimposed piles or series of glass plates or other transparent films or layers of non-crystalline material such as thin cellulose or gelatine films, for instance, have decided advantages since the reflected beams of light from such multiple thickness plates of glass, etc. when sufficient numbers are used, may be substantially plane polarized so as to be effective for these purposes. The other component of the light which is transmitted through such multiple plates or films, and which is more or less polarized in the complementary or transverse plane, may be used for various purposes such as illuminating the ground adjacent the base of a street lamp, for instance, or illuminating the road closely adjacent the headlight or spotlight of an automobile, in addition to the substantially horizontally directed beams of polarized light which are used for specific road illumination. It is of course understood, however, that other polarizing devices may be used for such light emission and for some specific purposes special forms of prisms or crystals or compositions may be used as light polarizing means.

In connection with such polarized light emission devices various types of polarized light viewing devices may be used comprising polarizing prisms or crystals of various types or where large area viewing devices are desired multiple plates of glass or other suitable material may be used with advantage, and for this purpose and for light emitting devices these multiple glass plates of thin plate or other preferably thinner glass may be advantageously united as by fusing or cementing some or all of their edges together as by vitreous material so as to prevent undesirable working and scratching and enable the glass plates to more or less reenforce and strengthen each other under service conditions and also to exclude dust and other undesirable material.

In the accompanying drawings showing in a somewhat diagrammatic way various illustrative embodiments of this apparatus and ways of carrying out these processes Fig. 1 is a diagrammatic perspective view showing street lamps and automobile headlights in connection with viewing devices.

Fig. 2 is a diagrammatic horizontal cross section through one type of headlight or other concentrated beam light emission device.

Fig. 3 is a corresponding vertical section thereof taken approximately through the center of Fig. 2 and perpendicular to plates 15, 15'.

Fig. 4 is a front view of the same.

Figs. 5 and 6 are diagrammatic horizontal sections of other light emission devices of similar type.

Fig. 7 is a horizontal diagrammatic section through a street lamp or other illuminating device taken substantially along the line 7—7 of Fig. 8.

Fig. 8 is a corresponding vertical section thereof.

Figs. 9, 10 and 11 are diagrammatic vertical sections showing other form of street lighting devices.

Figs. 12 and 13 are horizontal diagrammatic sections showing different types of searchlight or spotlight emission devices for vehicles, etc.

Fig. 14 is a vertical diagrammatic section through another headlight, and

Fig. 15 is a sectional detail thereof.

As indicated somewhat diagrammatically in Fig. 1, polarized light street lamps may be advantageously used in many cases, particularly at intersecting motor routes and the street lamp 29 is shown mounted at such a street intersection so that it can send out in some or all directions substantially horizontally directed beams of light 2 which may be polarized in any desired direction as, for instance, by being vertically polarized by means which will be subsequently described in greater detail. It is also desirable to have automobiles and other vehicles which are provided with strong headlights, spotlights or other lights directed along the road so arranged that these powerful lights will emit plane polarized light which is advantageously polarized in the same plane as the street lamps so that, for example, the headlights 6' on the automobile 28 may be equipped with polarized light emission devices adapted to emit reflected or transmitted beams of light 2' which are polarized in a vertical plane, for instance, where the street lamp 29 emits such vertically polarized beams of light. While these vertically polarized beams of light are effective in illuminating road objects or vehicles, the objectionable and confusing glare of such direct beams of polarized light may be prevented by using any suitable form of polarized light viewing devices which are adapted to wholly or largely cut out light which is polarized in such a vertical plane, for example. It is of course advantageous to have such polarized light viewing devices mounted adjacent the operator of an automobile and for this purpose a multiple glass plate viewing device 7 may be mounted on or may constitute the windshield 20 so as to cut out or divert by reflection upward the directly transmitted beams of vertically polarized light 2 and 2' so as not to confuse the operator's vision or prevent him from seeing the road objects or obstacles which may be illuminated by the light from his own similarly polarized light headlights 6, for example, or by any other source such as the street lamp 29. Other persons in the neighborhood who may be looking toward or approaching such street lamps or vehicle headlights may advantageously be provided with suitable polarized light viewing devices which may be multiple plates mounted adjacent windows of neighboring houses or arranged in the form of spectacles or made up in eye shield type and attached to a person's hat, headgear or wearing apparel in some instances, and Fig. 1 shows a pedestrian's spectacle type of polarized light viewing device 30 which may be of crystal, prism, or multiple transparent plate form arranged at such an angle as to largely or wholly cut off the vertically polarized beams of light, for example, which might tend to confuse such a person, particularly at a busy automobile corner.

An illustrative form of light emission device which may be used for headlights or spotlights for automobiles, etc., is shown in Figs. 2 to 4 as comprising a source of light such as a concentrated filament electric lamp 4, for instance, which may be mounted in the focus of a parabolic reflector 5, a shield 14 being preferably arranged in front of the lamp so as to cut out direct rays therefrom and thus secure a bundle of substantially parallel forwardly directed rays 1 which may be polarized by suitable means such as bundles or piles of plates of glass or other suitable material which may be arranged in V-form across the front of the lamp and supported between two protecting plates 15, 15' of glass etc. which may be mounted in the housing 16 in any suitable way which it is unnecessary to show or describe in detail. Piles or packs of thin plates or filaments of glass, cellulose acetate or other material may be angularly arranged on either side of light absorbing screens 9 of blackened metal, for instance, which project inwardly for a considerable distance at least between the angularly arranged piles of plates so as to absorb the reflected beams of light 3 in this instance while allowing the transmitted beams 2 which pass through the multiple plates 8 and thus become more or less polarized, so as to be used when projected forward along the path of an automobile or other vehicle, for example. Any desired number of such V-shaped multiple plates may be used in connection with the headlight or other lamp and as shown in Fig. 2, three such V-shaped piles of plates with an interposed screen may be used; or, as shown in Fig. 6, a single V-shaped arrangement of plates 8" of glass or other material may constitute the front of the headlight in some cases in connection with an interposed light absorbing screen 18. Fig. 5 shows somewhat diagrammatically another illustrative arrangement of V-shaped multiple plates in which the V-shaped pair of multiple plates are in this instance directed inwardly toward the lamp 4 so that the reflected rays 3 are in this case directed outward toward the inner surface of the casing 19 which may be blackened or otherwise treated so as to act with the desired efficiency as a light absorbing medium.

Other illustrative forms of lights for automobiles or other vehicles in which multiple plates are used for polarizing purposes are shown diagrammatically in Figs. 12 and 13 in which in this instance a single multiple plate or pile of thin glass or other non-crystalline sheet material 7 is mounted at the desired polarizing angle with respect to the forwardly directed light beams 2 which thus become polarized, the transmitted beams passing through these multiple plates being polarized in one direction, in the plane transverse to the paper in Fig. 2. The reflected beams of light 3 are of course polarized in the transverse direction and these reflected beams of polarized light which are in many cases more thoroughly or perfectly polarized, may be used as the forwardly directed beams of light as by passing the same through a plate of glass or other material 13 so that they can then be directed along the path of the automobile or other vehicle. If desired, however, these reflected rays may be directed laterally and downward toward the side of the road so as to be used for local illumination while the transmitted polarized rays of light 2 may be directed ahead of the vehicle along the road in the case of automobile headlights, for example.

Fig. 13 shows another illustrative arrangement in which the parallel rays of light 1 from the reflector 5 may be directed upward at a suitable angle against the pile of plates of glass or other material 7 arranged at the proper polarizing angle so as to produce the reflected polarized beams of light 2 which may be directed forward along the path of the vehicle. The transmitted rays of light may in this case be used for lateral or local illumination and may, if desired, strike a curved or angularly arranged reflector surface 14 and thus be reflected back through the pile of plates 7 so as to form the somewhat diffused angular rays of light 3 which may be directed downward and sidewise for local illumination adjacent the vehicle.

Various forms of street lamps may be used for producing polarized light which may be sent out in one or more directions or more or less uniformly sent out radially throughout a horizontal circle for general illumination adjacent a motor route intersection as shown in Fig. 1. Figs. 7 and 8 show somewhat diagrammatically an arrangement by which polarized light may be produced for street lighting purposes by means of piles of thin plates of glass or other suitable material 17 which may be arranged at the desired angle on each side of an opaque light absorbing screen 11 so as to form V-shaped light polarizing multiple plates or units, any desired number of which may be used around the centrally located lamp from which the rays of light 1 radiate so as to produce transmitted rays 2 of polarized light. Such a lamp may, of course, be supported in any desired way and may have a hood or cover 13 by which it may be suspended in some cases while a bottom or supporting member 12 may be arranged below the multiple plates, if desired.

Fig. 10 shows diagrammatically another illustrative arrangement in which a number of layers of relatively thin glass or other suitable material 24 are given such shape in reference to the concentrated filament or arc light 4 that the beams of light 1 from this source always strike the multiple thickness plates at substantially the desired light polarizing angle so as to give substantially plane polarized transmitted rays 2 where a sufficient number of plates or layers are used, the other component 3 of the light which is reflected from the different layers of plates and which is of course polarized in the transverse or complementary direction, being directed downwardly in this instance below the street lamp which may be suspended or otherwise supported in any desired way. In some cases the full unchanged rays from the lamp may be allowed to pass downward throughout a relatively small arc or circle near the vertical axis of the lamp to more intensely illuminate traffic signals or the like, although in many cases it is desirable to have a multiple plate polarizing unit 30 through which these vertically directed rays pass at such angles as to plane polarize the transmitted rays 2 passing through these multiple plates while the reflected rays such as 3 may be more or less absorbed where a blackened or other absorbent support 31 of large size is used for this interior lower unit.

Another type of street lamp which is in some respects more desirable is illustrated diagrammatically in Fig. 9 as comprising a parabolic reflector and hood 5' within which the intense filament lamp 4 may be mounted so as to form downwardly reflected rays which may be directed substantially vertically or preferably at slightly divergent angles as indicated so as to impinge upon the multiple plate polarizing unit 23 which may consist of a conical or pyramidal arrangement of the desired number of layers of thin glass or other suitable transparent polarizing films or plates 23 so as to give substantially plane polarized reflected rays 2 which may be directed more or less horizontally while the transmitted rays 3 which pass through these multiple plates and which are more or less polarized in the transverse direction are directed downward adjacent the base of the street lamp which may be supported on the pillar 22.

Fig. 11 shows diagrammatically another somewhat similar type of street lamp comprising a substantially parabolic reflector 54 which may serve as the lamp hood and be provided with suitable suspension means 56 and arranged so that a concentrated filament lamp 34 or arc arrangement, if desired, may be mounted at the focus of this reflector so as to produce substantially downwardly directed rays 61. A series of multiple plate polarizing elements 60 may be mounted below this reflector so as to be in the path of the light rays therefrom and these polarizing elements which may be made up of six or more superimposed thicknesses of thin glass or other suitable transparent material may be of generally conical or pyramidal form where the resulting reflected substantially plane polarized rays of light 62 are to be sent out in a number of directions. Where the light is only needed in two opposite horizontal directions along a single stretch of substantially straight road, the polarizing elements may be straight and are, of course, in all these cases mounted in suitable metallic or other supports so as to be held securely at the desired polarizing angle for the particular substance of which the plates are composed. These elements may also be advantageously enclosed and protected by a hemispherical glass globe such as 57 which may be secured to the rim 55 of the hood. The transmitted rays passing through these multiple plate polarizing elements 60 may extend downward more or less vertically as at 63 and, if desired, the width and positioning of the polarizing elements may be such as to allow some of the direct radial beams of light 64 to pass between them to more intensely illuminate the ground below the street lamp.

Fig. 14 shows diagrammatically a desirable form of searchlight or spotlight for automobiles or other vehicles in which a parabolic reflector such as 35 may be mounted within a cylindrical or other metallic casing 36 so that a concentrated filament lamp 34 which may have a front shield 34' may be mounted in the focus of the reflector so as to produce substantially parallel beams of light 51 which may be directed forwardly along the path of the vehicle. In the path of these parallel rays are mounted a series of inclined multiple plate polarizing elements 50 having metallic reflector strips mounted adjacent their upper surfaces so that the flat tops 39 of these reflector strips and the separate reflector plate or strip 39' at the bottom reflect the light rays upward as at 51' against the multiple plate polarizing element 50 above so as to produce substantially plane polarized forwardly reflected beams of light 53 while the transmitted light passing through all of the multiple plates 50 may be absorbed if the lower surface of these reflector or backing strips 39 is of black or other absorbent material or surface, as is desirable in some cases. As shown more in detail in Fig. 15, however, it is sometimes desirable to have these reflector strips formed with saw-tooth or stepped lower faces 38 next the multiple plate polarizing elements so that the refracted beams of light may be reflected backward at a greater downward angle through the multiple plates so as to be directed as at 52 toward the adjacent road surface for local illumination near the front of the automobile or other vehicle. A series of these reflector backed multiple plate polarizing elements may be mounted across the front of the headlight at such angles as to secure the proper polarizing action of the plates of glass or other material used and they should be spaced closely enough together so as to intercept all of the forwardly directed parallel beams of light from the parabolic reflector for which purpose the metallic or other reflector strip 39 may, as indicated in Fig. 15, extend past the lower edges of the multiple plate polarizing elements. These reflector strips may be rolled or otherwise formed of any suitable metal such as speculum metal, for instance, or nickel-plated brass may be used, if desired, or in some cases saw-toothed or otherwise corrugated strips of glass, which may have ground or other fairly flat upper surfaces, may be used for these reflector strips after applying silver or other reflecting coatings thereto where uniform expansion is of particular importance. In some cases it is advantageous to fuse or cement together one or more edges of the multiple glass or other transparent plate polarizing elements and this may be done by suitable local heating of the edges 50' of the glass plates after the whole plates have been brought up to a substantial or high heat. Or vitreous fluxes or enamels, preferably of substantially transparent character, may be applied to the edges to facilitate this heat union of the plates and where cellulose or other transparent films or plates are used more or less fluent or plastic cementing materials may be applied to the edges of the plates and then slightly heated in some cases to the necessary extent to cause union or connection of the edges of the plates through these cements which are, of course of such composition as to adhesively unite the particular transparent plates used.

This invention has been described in connection with a number of illustrative embodiments, forms, proportions, elements, parts, materials and arrangements, orders of steps, methods of preparation and use, to the details of which disclosure the invention is not of course to be limited since what is claimed as new and what is desired to be secured by Letters Patent is set forth in the appended claims.

I claim:

1. In illuminating apparatus, a street lamp comprising a source of light and cooperating polarizing devices producing by reflection vertically polarized light sent out in a substantially horizontal direction and transmitting light partially polarized in the complementary plane substantially vertically downward adjacent the base of said street lamp, and a vehicle comprising a headlight having a source of light and cooperating polarizing devices producing vertically polarized light sent out ahead of the vehicle in the direction of travel of the vehicle, and polarized light viewing devices adapted to be mounted adjacent the operator of the vehicle to substantially cut off vertically polarized light.

2. In illuminating apparatus, a street lamp comprising a source of light and cooperating polarizing devices producing vertically polarized light sent out in a substantially horizontal direction, and a vehicle comprising a headlight having a source of light and cooperating polarizing devices producing vertically polarized light sent out in the direction of travel of the vehicle, and polarized light viewing devices adapted to be mounted adjacent the operator of the vehicle, to substantially cut off vertically polarized light.

3. In illuminating apparatus, a street lamp comprising a source of light and cooperating polarizing devices producing polarized light sent out in a substantially horizontal direction, and a vehicle comprising a light having a source of light and cooperating polarizing devices producing similarly polarized light, and polarized light viewing devices adapted to be mounted adjacent the operator of the vehicle to substantially cut off polarized light.

4. In illuminating apparatus, a street lamp comprising a source of light and cooperating polarizing devices comprising multiple layer thin glass plates producing by reflection from said source of light vertically polarized light sent out in a substantially horizontal direction, a vehicle comprising a light having multiple plate reflecting polarizing devices producing vertically polarized light sent out in the direction of travel of the vehicle, and polarized light viewing devices mounted on the vehicle adjacent the operator of the vehicle and adapted to substantially cut off such vertically polarized light.

5. In illuminating apparatus, a street lamp comprising a source of light and cooperating polarizing devices producing vertically polarized light sent out in a substantially horizontal direction, a vehicle comprising a light having polarizing devices producing vertically polarized light sent out in the direction of the travel of the vehicle, and polarized light viewing devices mounted on the vehicle and adapted to substantially cut off such vertically polarized light.

6. In illuminating apparatus, a street lamp comprising a source of light and cooperating polarizing devices comprising multiple layers of glass producing vertically polarized light sent out in a substantially horizontal direction, an automobile comprising headlights each having a source of light and cooperating polarizing devices producing vertically polarized light sent out in the direction of travel of the vehicle, and polarized light viewing devices adapted to be mounted adjacent the eyes of an approaching person to substantially cut off vertically polarized light.

7. In illuminating apparatus, a street lamp comprising a source of light and cooperating polarizing devices producing polarizeed light sent out in a substantially horizontal direction, an automobile comprising headlights each having a source of light and cooperating polarizing devices producing such polarized light sent out in the direction of travel of the vehicle, and polarized light viewing devices adapted to be adjacent the eyes of an approaching person to substantially cut off polarized light.

8. In illuminating apparatus, a street lamp comprising a source of light and cooperating polarizing devices producing vertically polarized light sent out in a substantially horizontal direction and transmitting light downward adjacent the base of said street lamp, and a vehicle comprising a light having a source of light and cooperating polarizing devices producing similarly polarized light, and polarized light viewing devices mounted adjacent the eyes of an approaching person and adapted to substantially cut off vertically polarized light.

9. In illuminating apparatus, a street lamp comprising a source of light and cooperating polarizing devices producing polarized light, and a vehicle comprising a light having a source of light and cooperating polarizing devices producing similarly polarized light, and polarized light viewing devices mounted adjacent the eye of an approaching person and adapted to substantially cut off such polarized light.

10. In illuminating apparatus, an essentially completely hemispheric directional street lamp comprising a source of light and cooperating polarizing devices producing polarized light, and polarized light viewing devices mounted adjacent the eye of an approaching person and adapted to substantially cut off such polarized light.

11. In illuminating apparatus, a street lamp comprising a source of light and cooperating polarizing devices comprising multiple layer glass plates producing polarized light sent out in a substantially horizontal direction, and transmitting light partially polarized in a complementary plane downward adjacent the base of said lamp, and a vehicle comprising headlights each having a source of light and cooperating multiple layer glass plate polarizing devices producing similarly polarized light sent out ahead of the vehicle in its direction of travel.

12. In illuminating apparatus, a street lamp comprising a source of light and cooperating polarizing devices, producing polarized light sent out in a substantially horizontal direction, and transmitting light partially polarized in a complementary plane downward adjacent the base of said lamp, and a vehicle comprising headlights each having a source of light and cooperating polarizing devices producing similarly polarized light sent out ahead of the vehicle in its direction of travel.

13. In illuminating apparatus, a street lamp comprising a source of light and a cooperating downwardly directed substantially parabolic reflector and angularly arranged piles of thin glass plates below said reflector to produce reflected beams of vertically polarized light sent out in substantially opposite directions and adapted to be directed along a road, and to direct the transversely polarized component of light transmitted through said plates downward adjacent the base of said lamp, and a vehicle comprising piles of thin plates forming polarized light viewing devices mounted adjacent the operator of the vehicle to substantially cut off such horizontally directed vertically polarized light.

14. In illuminating apparatus, a street lamp comprising a source of light and a cooperating downwardly directed reflector and angularly arranged piles of thin plates below said reflector to produce reflected beams of vertically polarized light sent out in substantially opposite horizontal directions and adapted to be directed along a road, and to direct the transversely polarized component of light transmitted through said plates downward adjacent the base of said lamp, and a vehicle comprising polarized light viewing devices to substantially cut off such horizontally directed vertically polarized light.

15. In illuminating apparatus, an essentially completely hemispheric-directional street lamp comprising a source of light and angularly arranged piles of thin plates to produce reflected beams of polarized light sent out in substantially horizontal directions and adapted to be directed along a road, and a vehicle comprising polarized light viewing devices to substantially cut off such horizontally directed vertically polarized light.

16. In illuminating apparatus, a street lamp comprising a source of light and a cooperating downwardly directed substantially parabolic reflector and angularly arranged piles of thin conical glass plates below said reflector to produce reflected beams of vertically polarized light sent out in substantially opposite horizontal directions and adapted to be directed along roadways, and to direct the transversely polarized component of light transmitted through said plates downward adjacent the base of said lamp.

17. In illuminating apparatus, a street lamp, comprising a source of light and a cooperating downwardly directed substantially parabolic reflector and angularly arranged piles of thin plates below said reflector to produce beams of vertically polarized light sent out in substantially horizontal directions and adapted to be directed along roadways, and to direct the transversely polarized component of light transmitted through said plates downward adjacent the base of said lamp.

18. In illuminating apparatus, an essentially completely hemispheric-directional street lamp comprising a source of light and a cooperating downwardly directed reflector and angularly arranged piles of thin plates below said reflector to produce beams of polarized light sent out in substantially horizontal directions and adapted to be directed along roadways.

19. In illuminating apparatus, a street lamp comprising a source of light and cooperating reflecting and polarizing devices comprising piles of thin plates to produce beams of vertically polarized light sent out in substantially horizontal directions and adapted to be directed along roadways, and to direct the transversely polarized component of light transmitted through said plates in different directions adjacent said lamp.

20. In illuminating apparatus, an essentially completely hemispheric-directional street lamp comprising a source of light and cooperating reflecting and polarizing devices comprising piles of thin plates to produce beams of polarized light sent out in substantially horizontal directions and adapted to be directed along roadways.

21. In illuminating apparatus, an essentially completely hemispheric-directional street lamp comprising a source of light and cooperating polarizing devices to produce beams of polarized light adapted to be directed along roadways.

22. A roadway illuminating apparatus, comprising a source of light and cooperating polarizing devices having angularly arranged multiple glass plates substantially forming surfaces of revolution to produce beams of polarized light sent out in substantially horizontal directions and adapted to be directed along roadways, and to direct the transversely polarized component of light adjacent said lamp.

23. A roadway illuminating apparatus, comprising a source of light and cooperating polarizing devices having angularly arranged multiple plates substantially forming surfaces of revolution to produce beams of polarized light sent out in substantially horizontal directions and adapted to be directed along roadways.

24. A roadway illuminating apparatus, comprising a source of light and cooperating polarizing devices substantially forming surfaces of revolution to produce beams of polarized light.

25. The method of illuminating roadways which comprises sending out essentially completely hemispheric-directionally as well as substantially horizontally along the roadways beams of vertically polarized light from a fixed source, and illuminating portions of the roadways by substantially horizontally forwardly directed beams of similarly polarized light from a normally moving source, and cutting out objectionable direct glare of such light from the line of vision of one viewing said roadways by polarized light viewing devices substantially cutting off such polarized light.

26. The method of illuminating roadways which comprises sending out along the roadways beams of polarized light from fixed sources, and illuminating portions of the roadways by forwardly directed beams of similarly polarized light from normally moving sources, and cutting out objectionable direct glare of such light from the line of vision of one viewing the roadways by polarized light viewing devices substantially cutting off such polarized light.

27. The method of illuminating automobile roadways and their intersections which comprises illuminating roadway intersections by downwardly directed light from adjacent elevated fixed sources, sending out substantially horizontally along the roadways beams of vertically polarized light from said fixed sources, illuminating portions of the roadways by substantially horizontally forwardly directed beams of vertically polarized light from normally moving sources and cutting out objectionable direct glare of such light from the line of vision of one viewing said roadways by polarized viewing devices substantially cutting off vertically polarized light.

28. The method of illuminating automobile roadways and their intersections which comprises illuminating roadway intersections by downwardly directed light from adjacent elevated fixed sources, sending out substantially horizontally along the roadways beams of polarized light from said fixed sources, illuminating portions of the roadways by substantially horizontally forwardly directed beams of polarized light from normally moving sources, and cutting out objectionable glare from such light from the line of vision of one viewing said roadways by polarized light viewing devices substantially cutting off such polarized light.

29. The method of illuminating automobile roadways and their intersections which comprises illuminating roadway intersections by downwardly directed light from adjacent fixed sources, sending out substantially horizontally along the roadways beams of polarized light from said fixed sources, and cutting out objectionable direct glare of such light from the line of vision of one viewing said roadways by polarized light viewing devices substantially cutting off such polarized light.

30. The method of illuminating roadways which comprises sending out essentially completely hemispheric-directionally as well as substantially horizontally along the roadways beams of polarized light from fixed sources, and cutting out objectionable direct glare of such light from the line of vision of one viewing said roadways by polarized light viewing devices substantially cutting off such polarized light.

31. The method of illuminating roadways or their intersections which comprises sending out essentially completely hemispheric-directionally as well as substantially horizontally along the roadways beams of polarized light from fixed sources and illuminating portions of the roadways by the forwardly directed beams of similarly polarized light from normally moving sources.

32. The method of illuminating the path of travel of vehicles or other moving objects which comprises projecting upon said path beams of polarized light from fixed sources, illuminating portions of said paths by the beams of similarly polarized light from normally moving sources, and viewing said beams of light through polarizing means.

33. The method of illuminating automobile roadways or their intersections which comprises sending out along the roadways beams of vertically polarized light from elevated fixed sources, and illuminating portions of the roadways adjacent said fixed sources of light by downwardly directed beams of differently polarized light simultaneously produced by said fixed sources.

34. The method of illuminating automobile roadways or their intersections which comprises sending out along the roadways beams of definitely polarized light from elevated fixed sources, and illuminating portions of the roadways adjacent said fixed sources of light by differently polarized light simultaneously produced by said fixed sources.

35. The process of illuminating roadways or their intersections, which comprises sending out essentially completely hemispheric-directionally as well as substantially longitudinally along the roadways beams of vertically polarized light from a source of light and illuminating portions of the roadways by downwardly directed light from said source.

36. The process of illuminating roadways, which comprises sending out essentially completely hemispheric-directionally as well as substantially longitudinally along the roadways beams of vertically polarized light from a source of light.

37. The headlight apparatus for automobiles or other vehicles comprising a pair of headlights each provided with plate glass reflecting polarizing devices to form a substantially vertically polarized reflected beam of light transmitted ahead of the vehicle and a downwardly inclined refracted beam of light illuminating the road surface under and adjacent the automobile and polarized light viewing devices through which the driver of the vehicle can look and comprising adjustable light polarizing devices adapted to substantially cut off light polarized in a vertical plane to thereby eliminate the objectionable glare of the headlights of a similarly equipped approaching vehicle.

FRANK SHORT.